United States Patent
Li et al.

(10) Patent No.: US 12,335,012 B2
(45) Date of Patent: Jun. 17, 2025

(54) METHOD AND APPARATUS FOR FAULT MITIGATION IN BASE STATION

(71) Applicant: Telefonaktiebolaget LM Ericsson (publ), Stockholm (SE)

(72) Inventors: Ming Li, Stockholm (SE); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 621 days.

(21) Appl. No.: 17/762,236

(22) PCT Filed: Sep. 30, 2019

(86) PCT No.: PCT/CN2019/109348
§ 371 (c)(1),
(2) Date: Mar. 21, 2022

(87) PCT Pub. No.: WO2021/062592
PCT Pub. Date: Apr. 8, 2021

(65) Prior Publication Data
US 2022/0376765 A1    Nov. 24, 2022

(51) Int. Cl.
H04B 7/06    (2006.01)
H04B 17/10    (2015.01)
H04B 17/17    (2015.01)
H04W 16/28    (2009.01)

(52) U.S. Cl.
CPC ......... H04B 7/0695 (2013.01); H04B 17/102 (2015.01); H04B 17/17 (2015.01); H04W 16/28 (2013.01)

(58) Field of Classification Search
None
See application file for complete search history.

(56) References Cited

U.S. PATENT DOCUMENTS

| | | | | |
|---|---|---|---|---|
| 5,585,803 A | * | 12/1996 | Miura | H01Q 3/26 342/372 |
| 8,049,661 B1 | | 11/2011 | Loberger | |
| 2009/0243931 A1 | * | 10/2009 | Weckerle | H01Q 1/246 342/372 |

(Continued)

FOREIGN PATENT DOCUMENTS

| | | |
|---|---|---|
| CN | 101281997 A | 10/2008 |
| CN | 103236587 A | 8/2013 |

(Continued)

OTHER PUBLICATIONS

Communication pursuant to Article 94(3) EPC for European Patent Application No. 19947765.4 dated Aug. 28, 2024 (5 pages).

(Continued)

*Primary Examiner* — Robert M Morlan
(74) *Attorney, Agent, or Firm* — Sage Patent Group

(57) ABSTRACT

A method and an apparatus for fault mitigation in a base station are disclosed. According to an embodiment, a faulty antenna element in an antenna array is detected. The antenna array transmits a first beam covering a predetermined range of directions. A target direction in which radiation power dropped due to a fault of the detected faulty antenna element is determined. A second beam pointing to the determined target direction is generated.

22 Claims, 14 Drawing Sheets

(56) References Cited

U.S. PATENT DOCUMENTS

| | | |
|---|---|---|
| 2013/0183907 A1 | 7/2013 | Kim et al. |
| 2015/0380807 A1 | 12/2015 | Owen et al. |
| 2018/0159638 A1 | 6/2018 | Awadin et al. |
| 2019/0335443 A1* | 10/2019 | Liu ........................ H04L 5/0048 |
| 2020/0235875 A1* | 7/2020 | Sha ......................... H04L 5/005 |

FOREIGN PATENT DOCUMENTS

| | | | |
|---|---|---|---|
| WO | 2016183957 A1 | 11/2016 | |
| WO | WO-2018056876 A1 * | 3/2018 | ............. H01Q 1/245 |
| WO | 2019069119 A1 | 4/2019 | |

OTHER PUBLICATIONS

International Search Report and Written Opinion of the International Searching Authority for PCT International Application No. PCT/CN2019/109348 dated Jun. 30, 2020.

\* cited by examiner

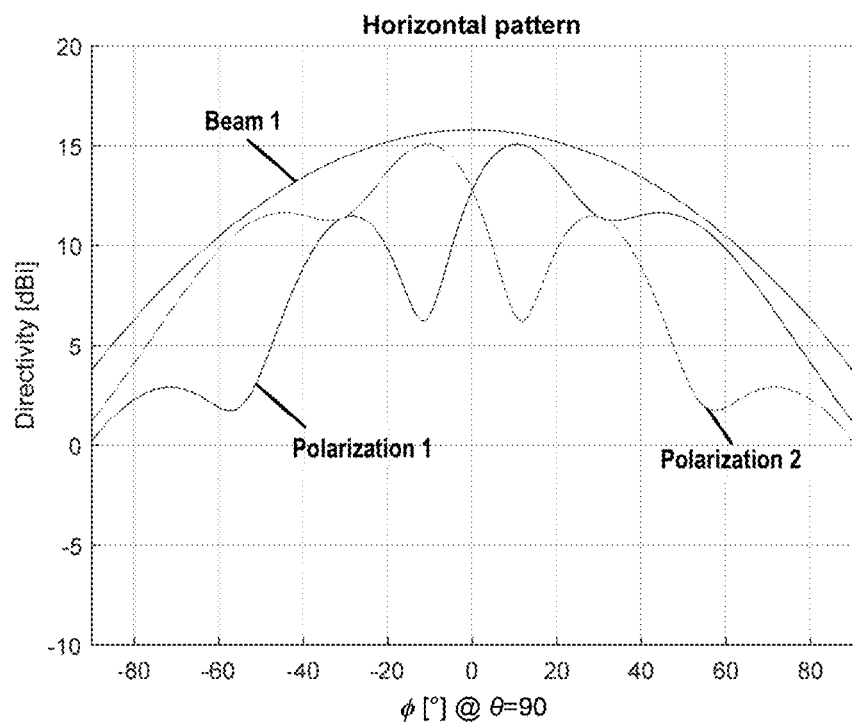
FIG. 2B
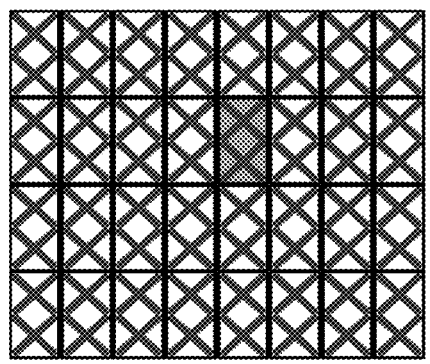
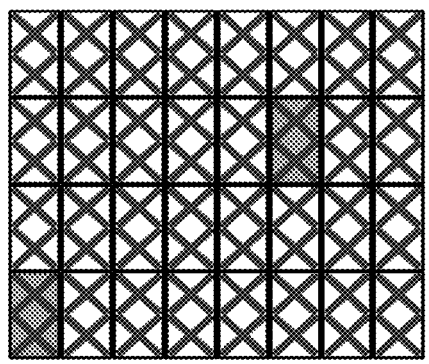
FIG. 3A      FIG. 3B

METHOD AND APPARATUS FOR FAULT MITIGATION IN BASE STATION

CROSS REFERENCE TO RELATED APPLICATION

This application is a 35 U.S.C. § 371 national stage application of PCT International Application No. PCT/CN2019/109348 filed on Sep. 30, 2019, the disclosure and content of which is incorporated by reference herein in its entirety.

TECHNICAL FIELD

Embodiments of the disclosure generally relate to wireless communication, and, more particularly, to a method and an apparatus for fault mitigation in a base station.

BACKGROUND

This section introduces aspects that may facilitate better understanding of the present disclosure. Accordingly, the statements of this section are to be read in this light and are not to be understood as admissions about what is in the prior art or what is not in the prior art.

For classic radio in long term evolution (LTE), the mobility is defined by cell-specific reference symbol (CRS). The CRS is a specific case of broadcasting beam. In the case of an antenna configuration with the classic radio, such as the 2 transmitter (2-TX) configuration shown in FIG. 1, each antenna branch will have a specific CRS. The first configured antenna branch will have CRS0 allocated; the second one will have CRS1 allocated; and so on. A user equipment (UE) will always start to listen to CRS0, and then to the other reference symbols if they exist.

In the case of multi-antenna radio, to keep the same mobility and standardization limitation, CRS numbers cannot be increased to be the same with the number of antenna branches. For example, FIG. 2A illustrates a typical 64-transmitter 64-receiver (64T64R) active antenna system (AAS). The left half-panel is assigned as CRS0 port and the right half-panel is CRS1 port. FIG. 2B illustrates simulated beam patterns for the AAS of FIG. 2A. The beam patterns demonstrate beam1 (same to CRS0 and CRS1) which is orthogonally combined by two polarizations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide a solution for fault mitigation in a base station.

According to a first aspect of the disclosure, there is provided a method in a base station. The method may comprise detecting a faulty antenna element in an antenna array. The antenna array may transmit a first beam covering a predetermined range of directions. The method may further comprise determining a target direction in which radiation power dropped due to a fault of the detected faulty antenna element. The method may further comprise generating a second beam pointing to the determined target direction.

In this way, the impact of the faulty antenna element can be mitigated conveniently without changing the original beam weights applied to the antenna array for transmitting the first beam.

In an embodiment of the disclosure, determining the target direction may comprise determining a first distribution of first beam weights of the first beam over an arrangement of antenna elements of the antenna array. The first beam weights may correspond to a first case in which there is no faulty antenna element in the antenna array. Determining the target direction may further comprise determining a second distribution of second beam weights of the first beam over the arrangement of the antenna elements of the antenna array. The second beam weights may correspond to a second case in which there is the detected faulty antenna element in the antenna array. Determining the target direction may further comprise determining a third distribution of first radiation powers of the first beam corresponding to the first case over a plurality of directions, based on the first distribution. Determining the target direction may further comprise determining a fourth distribution of second radiation powers of the first beam corresponding to the second case over a plurality of directions, based on the second distribution. Determining the target direction may further comprise determining the target direction based on the third and fourth distributions.

In an embodiment of the disclosure, the third distribution may be determined by applying two-dimensional (2D) Fourier transformation to the first distribution. The fourth distribution may be determined by applying 2D Fourier transformation to the second distribution.

In an embodiment of the disclosure, the 2D Fourier transformation may comprise 2D fast Fourier transformation (2D-FFT).

In an embodiment of the disclosure, the first beam may have two component beams with different polarizations orthogonal to each other. Two first distributions, two second distributions, two third distributions and two fourth distributions may be determined for the two component beams.

In an embodiment of the disclosure, determining the target direction based on the third and fourth distributions may comprise determining, for the directions indicated in the third and fourth distributions, whether the first radiation power in a first direction is above a first predetermined threshold and a difference between the first and second radiation powers in the first direction is above a second predetermined threshold. Determining the target direction based on the third and fourth distributions may further comprise, when a result of the determining is positive for the first direction, determining the first direction as the target direction.

In an embodiment of the disclosure, determining the target direction based on the third and fourth distributions may comprise determining, for the directions indicated in a sum of the two third distributions and a sum of the two fourth distributions, whether the first radiation power in a first direction is above a first predetermined threshold and a difference between the first and second radiation powers in the first direction is above a second predetermined threshold. Determining the target direction based on the third and fourth distributions may further comprise, when a result of the determining is positive for the first direction, determining the first direction as the target direction.

In an embodiment of the disclosure, in the second distribution the second beam weight corresponding to the detected faulty antenna element may be below a third predetermined threshold.

In an embodiment of the disclosure, the first distribution may be represented by a matrix whose dimension is the same as that of the arrangement of the antenna elements of the antenna array.

In an embodiment of the disclosure, the first distribution may be represented by an extended matrix whose dimension is larger than that of the arrangement of the antenna elements of the antenna array. Elements in the extended matrix for which there are no corresponding antenna elements may equal to zero.

In an embodiment of the disclosure, the extended matrix may be used for representing the first distribution when a number of rows or columns contained in the arrangement of the antenna elements of the antenna array is below a predetermined number.

In an embodiment of the disclosure, determining the target direction may comprise receiving, from terminal devices served by the antenna array, reports indicating directions and quality parameters of signals received by the terminal devices. Determining the target direction may further comprise determining the target direction based on the received reports.

In an embodiment of the disclosure, a report received from a terminal device may be a channel status indicator (CSI) report. The CSI report may include precoder matrix index (PMI) indicating the direction of a signal received by the terminal device. The CSI report may include downlink signal channel quality indicator (CQI) indicating the quality of a signal received by the terminal device.

In an embodiment of the disclosure, determining the target direction based on the received reports may comprise determining a distribution of signal quality parameters over a plurality of directions, based on the received reports. Determining the target direction based on the received reports may further comprise determining, for the directions indicated in the distribution, whether the signal quality in a second direction is below a fourth predetermined threshold. Determining the target direction based on the received reports may further comprise, when a result of the determining is positive for the second direction, determining the second direction as the target direction.

In an embodiment of the disclosure, the second beam may be generated to have a predetermined delay or a predetermined timing advance relative to the first beam.

In an embodiment of the disclosure, the second beam may be generated to have a predetermined cyclic phase shift per subcarrier in frequency domain.

In an embodiment of the disclosure, the second beam may be generated to have a second polarization orthogonal to a first polarization of the first beam in the target direction.

In an embodiment of the disclosure, the first beam may have two component beams with different polarizations orthogonal to each other. The first polarization of the first beam may be the polarization of one component beam whose radiation power is larger than that of the other component beam by a predetermined difference value or more.

In an embodiment of the disclosure, more than one faulty antenna elements in the antenna array may be detected.

In an embodiment of the disclosure, more than one target directions may be determined and more than one second beams may be generated.

In an embodiment of the disclosure, the first beam may be a broadcasting beam.

In an embodiment of the disclosure, the base station may comprise a building baseband unit (BBU), a remote radio unit (RRU), and the antenna array. The detecting of the faulty antenna element, the determining of the target direction and the generating of the second beam may be performed by one of the BBU and the RRU, or distributed between the BBU and the RRU.

In an embodiment of the disclosure, the base station may be partly implemented in a centralized unit (CU), and partly implemented as a distributed unit (DU), and an active antenna unit (AAU) including the antenna array. The detecting of the faulty antenna element, the determining of the target direction and the generating of the second beam may be performed by one of the CU, the DU and the AAU, or distributed between two or more of the CU, the DU and the AAU.

According to a second aspect of the disclosure, there is provided an apparatus in a base station. The apparatus may comprise at least one processor and at least one memory. The at least one memory may contain instructions executable by the at least one processor, whereby the apparatus may be operative to detect a faulty antenna element in an antenna array. The antenna array may transmit a first beam covering a predetermined range of directions. The apparatus may be further operative to determine a target direction in which radiation power dropped due to a fault of the detected faulty antenna element. The apparatus may be further operative to generate a second beam pointing to the determined target direction.

In an embodiment of the disclosure, the instructions may be executable by the at least one processor, whereby the apparatus may be operative to determine the target direction by determining a first distribution of first beam weights of the first beam over an arrangement of antenna elements of the antenna array. The first beam weights may correspond to a first case in which there is no faulty antenna element in the antenna array. The instructions may be executable by the at least one processor, whereby the apparatus may be operative to determine the target direction by determining a second distribution of second beam weights of the first beam over the arrangement of the antenna elements of the antenna array. The second beam weights may correspond to a second case in which there is the detected faulty antenna element in the antenna array. The instructions may be executable by the at least one processor, whereby the apparatus may be operative to determine the target direction by determining a third distribution of first radiation powers of the first beam corresponding to the first case over a plurality of directions, based on the first distribution. The instructions may be executable by the at least one processor, whereby the apparatus may be operative to determine the target direction by determining a fourth distribution of second radiation powers of the first beam corresponding to the second case over a plurality of directions, based on the second distribution. The instructions may be executable by the at least one processor, whereby the apparatus may be operative to determine the target direction by determining the target direction based on the third and fourth distributions.

In an embodiment of the disclosure, the instructions may be executable by the at least one processor, whereby the apparatus may be operative to determine the third distribution by applying 2D Fourier transformation to the first distribution. The instructions may be executable by the at least one processor, whereby the apparatus may be operative to determine the fourth distribution by applying 2D Fourier transformation to the second distribution.

In an embodiment of the disclosure, the 2D Fourier transformation may comprise 2D-FFT.

In an embodiment of the disclosure, the first beam may have two component beams with different polarizations orthogonal to each other. The instructions may be executable by the at least one processor, whereby the apparatus may be operative to determine two first distributions, two second distributions, two third distributions and two fourth distributions for the two component beams.

In an embodiment of the disclosure, the instructions may be executable by the at least one processor, whereby the apparatus may be operative to determine the target direction based on the third and fourth distributions by determining, for the directions indicated in the third and fourth distributions, whether the first radiation power in a first direction is above a first predetermined threshold and a difference between the first and second radiation powers in the first direction is above a second predetermined threshold. The instructions may be executable by the at least one processor, whereby the apparatus may be operative to determine the target direction based on the third and fourth distributions by determining the first direction as the target direction when a result of the determining is positive for the first direction.

In an embodiment of the disclosure, the instructions may be executable by the at least one processor, whereby the apparatus may be operative to determine the target direction based on the third and fourth distributions by determining, for the directions indicated in a sum of the two third distributions and a sum of the two fourth distributions, whether the first radiation power in a first direction is above a first predetermined threshold and a difference between the first and second radiation powers in the first direction is above a second predetermined threshold. The instructions may be executable by the at least one processor, whereby the apparatus may be operative to determine the target direction based on the third and fourth distributions by determining the first direction as the target direction when a result of the determining is positive for the first direction.

In an embodiment of the disclosure, in the second distribution the second beam weight may corresponding to the detected faulty antenna element may be below a third predetermined threshold.

In an embodiment of the disclosure, the first distribution may be represented by a matrix whose dimension is the same as that of the arrangement of the antenna elements of the antenna array.

In an embodiment of the disclosure, the first distribution may be represented by an extended matrix whose dimension is larger than that of the arrangement of the antenna elements of the antenna array. Elements in the extended matrix for which there are no corresponding antenna elements may equal to zero.

In an embodiment of the disclosure, the extended matrix may be used for representing the first distribution when a number of rows or columns contained in the arrangement of the antenna elements of the antenna array is below a predetermined number.

In an embodiment of the disclosure, the instructions may be executable by the at least one processor, whereby the apparatus may be operative to determine the target direction by receiving, from terminal devices served by the antenna array, reports indicating directions and quality parameters of signals received by the terminal devices. The instructions may be executable by the at least one processor, whereby the apparatus may be operative to determine the target direction by determining the target direction based on the received reports.

In an embodiment of the disclosure, a report received from a terminal device may be a CSI report. The CSI report may include PMI indicating the direction of a signal received by the terminal device. The CSI report may include downlink signal CQI indicating the quality of a signal received by the terminal device.

In an embodiment of the disclosure, the instructions may be executable by the at least one processor, whereby the apparatus may be operative to determine the target direction based on the received reports by determining a distribution of signal quality parameters over a plurality of directions, based on the received reports. The instructions may be executable by the at least one processor, whereby the apparatus may be operative to determine the target direction based on the received reports by determining, for the directions indicated in the distribution, whether the signal quality in a second direction is below a fourth predetermined threshold. The instructions may be executable by the at least one processor, whereby the apparatus may be operative to determine the target direction based on the received reports by determining the second direction as the target direction when a result of the determining is positive for the second direction.

In an embodiment of the disclosure, the instructions may be executable by the at least one processor, whereby the apparatus may be operative to generate the second beam to have a predetermined delay or a predetermined timing advance relative to the first beam.

In an embodiment of the disclosure, the instructions may be executable by the at least one processor, whereby the apparatus may be operative to generate the second beam to have a predetermined cyclic phase shift per subcarrier in frequency domain.

In an embodiment of the disclosure, the instructions may be executable by the at least one processor, whereby the apparatus may be operative to generate the second beam to have a second polarization orthogonal to a first polarization of the first beam in the target direction.

In an embodiment of the disclosure, the first beam may have two component beams with different polarizations orthogonal to each other. The first polarization of the first beam may be the polarization of one component beam whose radiation power is larger than that of the other component beam by a predetermined difference value or more.

In an embodiment of the disclosure, the instructions may be executable by the at least one processor, whereby the apparatus may be operative to detect more than one faulty antenna elements in the antenna array.

In an embodiment of the disclosure, the instructions may be executable by the at least one processor, whereby the apparatus may be operative to determine more than one target directions and generate more than one second beams.

In an embodiment of the disclosure, the first beam may be a broadcasting beam.

In an embodiment of the disclosure, the apparatus may be one of: a BBU; an RRU; a combination of a BBU and an RRU; a CU; a DU; an AAU; and a combination of two or more of a CU, a DU and an AAU.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided an apparatus in a base station. The apparatus may comprise a detection module configured to detect a faulty antenna element in an antenna array. The antenna array may transmit a first beam covering a predetermined range of directions. The apparatus may further comprise a determination module configured to determine a target direction in which radiation power dropped due to a fault of the detected faulty antenna element. The apparatus may further comprise a generation module configured to generate a second beam pointing to the determined target direction.

In an embodiment of the disclosure, the determination module may be configured to determine the target direction by determining a first distribution of first beam weights of the first beam over an arrangement of antenna elements of the antenna array. The first beam weights may correspond to a first case in which there is no faulty antenna element in the antenna array. The determination module may be configured to determine the target direction by determining a second distribution of second beam weights of the first beam over the arrangement of the antenna elements of the antenna array. The second beam weights may correspond to a second case in which there is the detected faulty antenna element in the antenna array. The determination module may be configured to determine the target direction by determining a third distribution of first radiation powers of the first beam corresponding to the first case over a plurality of directions, based on the first distribution. The determination module may be configured to determine the target direction by determining a fourth distribution of second radiation powers of the first beam corresponding to the second case over a plurality of directions, based on the second distribution. The determination module may be configured to determine the target direction by determining the target direction based on the third and fourth distributions.

In an embodiment of the disclosure, the determination module may be configured to determine the third distribution by applying 2D Fourier transformation to the first distribution. The determination module may be configured to determine the fourth distribution by applying 2D Fourier transformation to the second distribution.

In an embodiment of the disclosure, the 2D Fourier transformation may comprise 2D-FFT.

In an embodiment of the disclosure, the first beam may have two component beams with different polarizations orthogonal to each other. Two first distributions, two second distributions, two third distributions and two fourth distributions may be determined by the determination module for the two component beams.

In an embodiment of the disclosure, the determination module may be configured to determine the target direction based on the third and fourth distributions by determining, for the directions indicated in the third and fourth distributions, whether the first radiation power in a first direction is above a first predetermined threshold and a difference between the first and second radiation powers in the first direction is above a second predetermined threshold. The determination module may be configured to determine the target direction based on the third and fourth distributions by determining the first direction as the target direction when a result of the determining is positive for the first direction.

In an embodiment of the disclosure, the determination module may be configured to determine the target direction based on the third and fourth distributions by determining, for the directions indicated in a sum of the two third distributions and a sum of the two fourth distributions, whether the first radiation power in a first direction is above a first predetermined threshold and a difference between the first and second radiation powers in the first direction is above a second predetermined threshold. The determination module may be configured to determine the target direction based on the third and fourth distributions by determining the first direction as the target direction when a result of the determining is positive for the first direction.

In an embodiment of the disclosure, in the second distribution the second beam weight corresponding to the detected faulty antenna element may be below a third predetermined threshold.

In an embodiment of the disclosure, the first distribution may be represented by a matrix whose dimension is the same as that of the arrangement of the antenna elements of the antenna array.

In an embodiment of the disclosure, the first distribution may be represented by an extended matrix whose dimension is larger than that of the arrangement of the antenna elements of the antenna array. Elements in the extended matrix for which there are no corresponding antenna elements may equal to zero.

In an embodiment of the disclosure, the extended matrix may be used for representing the first distribution when a number of rows or columns contained in the arrangement of the antenna elements of the antenna array is below a predetermined number.

In an embodiment of the disclosure, the determination module may be configured to determine the target direction by receiving, from terminal devices served by the antenna array, reports indicating directions and quality parameters of signals received by the terminal devices. The determination module may be configured to determine the target direction by determining the target direction based on the received reports.

In an embodiment of the disclosure, a report received from a terminal device may be a CSI report. The CSI report may include PMI indicating the direction of a signal received by the terminal device. The CSI report may include downlink signal CQI indicating the quality of a signal received by the terminal device.

In an embodiment of the disclosure, the determination module may be configured to determine the target direction based on the received reports by determining a distribution of signal quality parameters over a plurality of directions, based on the received reports. The determination module may be configured to determine the target direction based on the received reports by determining, for the directions indicated in the distribution, whether the signal quality in a second direction is below a fourth predetermined threshold. The determination module may be configured to determine the target direction based on the received reports by determining the second direction as the target direction when a result of the determining is positive for the second direction.

In an embodiment of the disclosure, the generation module may be configured to generate the second beam to have a predetermined delay or a predetermined timing advance relative to the first beam.

In an embodiment of the disclosure, the generation module may be configured to generate the second beam to have a predetermined cyclic phase shift per subcarrier in frequency domain In an embodiment of the disclosure, the generation module may be configured to generate the second beam to have a second polarization orthogonal to a first polarization of the first beam in the target direction.

In an embodiment of the disclosure, the first beam may have two component beams with different polarizations orthogonal to each other. The first polarization of the first beam may be the polarization of one component beam whose radiation power is larger than that of the other component beam by a predetermined difference value or more.

In an embodiment of the disclosure, more than one faulty antenna elements in the antenna array may be detected by the detection module.

In an embodiment of the disclosure, more than one target directions may be determined by the determination module and more than one second beams may be generated by the generation module.

In an embodiment of the disclosure, the first beam may be a broadcasting beam.

In an embodiment of the disclosure, the apparatus may be one of: a BBU; an RRU; a combination of a BBU and an RRU; a CU; a DU; an AAU; and a combination of two or more of a CU, a DU and an AAU.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIGS. 2A-2B illustrate a typical AAS and the beam patterns thereof;

FIGS. 3A-3D illustrate exemplary examples of faulty antenna elements;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

Multi-antenna radio could face different faults occasionally. For example, a power transistor is broken; a low-noise amplifier (LNA) is broken; an antenna element is disconnected; some transceivers are shut down; and the like. For simplifying the description, all fault types may be treated as antenna fault, because a signal cannot be transmitted or received from the antenna element from an external perspective. If faulty antenna element(s) occur, for example, as shown in FIGS. 3A-3D, the curve of the broadcasting beam will be distorted, which will impact the cell coverage.

Figure 4:
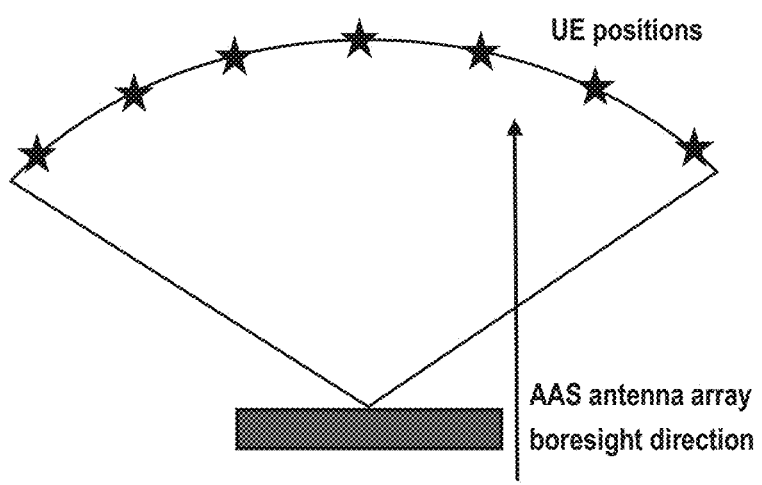
FIG. 4 is a diagram illustrating the positions of UEs relative to an AAS array.
Figure 5A:
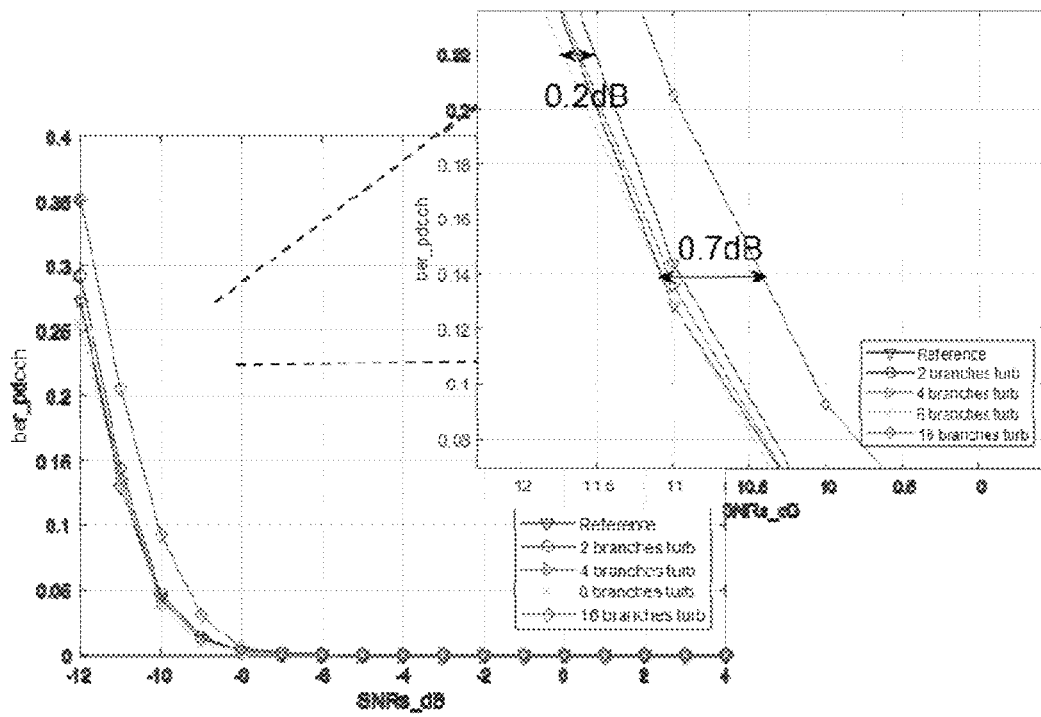
FIGS. 5A-5B illustrate the impact of faulty antenna elements to BER of PDCCH.
Figure 5B:
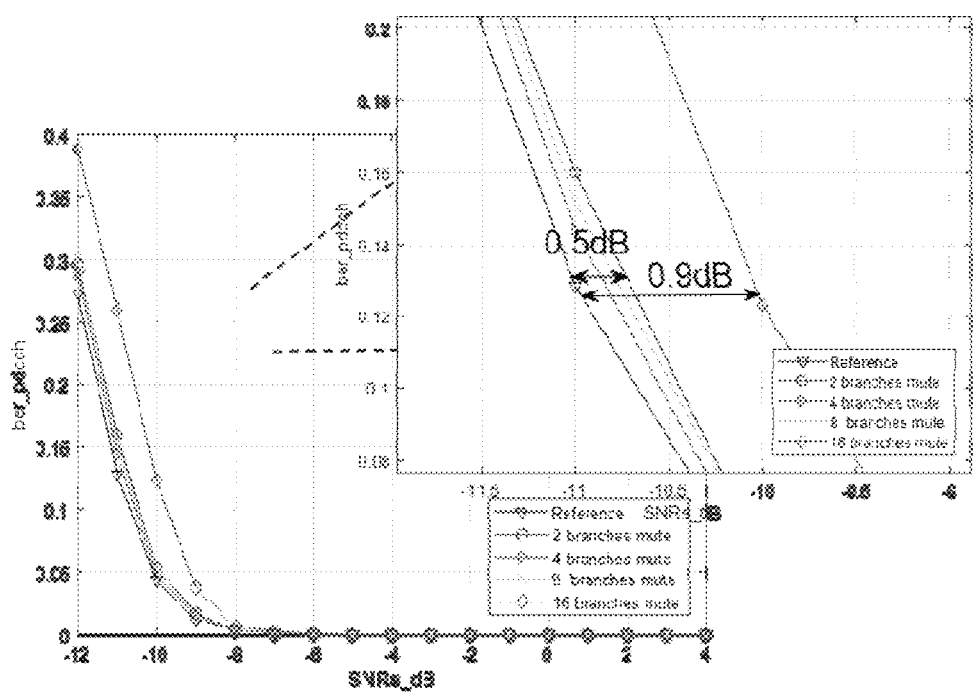

FIGS. 5A-5B illustrate the simulated impact of faulty antenna element(s) to the bit error rate (BER) of physical downlink control channel (PDCCH) which is transmitted in a broadcasting beam. The term "phase disturb" means random phase happens and the term "mute" means the antenna branch has no signal transmission. The simulation results shown in FIGS. 5A-5B are based on the assumption shown in FIG. 4 where UEs are symmetrically positioned to the AAS base station antenna array.

As shown in the simulation results of FIGS. 5A-5B, disturb can bring some spikes in some directions, which could be the reason why 8-branches disturbance could bring better PDCCH performance than 8-branches mute. There is no big difference in average BER between the disturbance and mute cases. The pure power loss due to 2-branches mute (10*log 10(64/62)) equals to 0.138 dB; the pure power loss due to 8-branches mute (10*log 10(64/56)) equals to 0.58 dB; the real performance of PDCCH is better than the power loss calculation. In addition, 8 branches have no obvious degradation, while the degradation of 16 branches is obvious. Thus, in most common cases, if there are limited branches being broken (e.g. 8 or less branches being broken), the system will just arise an alarm, but still keep the service.

According to the simulation and analysis, below are points about how antenna faults impact common channel served by a broadcasting beam, for example, PDCCH:
    If we talk about total transmission power loss due to some branches failing to send out power, 8-branches fault could introduce 0.5 dB degradation in 64-transmitters/receivers (64TRX) system; 16-branches fault could introduce 1 dB power degradation in 64TRX system.
    In some specific antenna fault condition, some UEs could have worse broadcasting beam performance. Normally there will be a nulling towards some UE direction.

Thus, in most antenna broken cases, faulty antenna element(s) have a quite limited impact on broadcasting beam since they just introduce some power loss. However, in the worst case, they have a big impact on specific direction since they change the shape of the broadcasting beam and generate a deep nulling towards to desired serving area. In order to still keep the system working even in the worst case, currently there are some algorithms based on overall-local optimization to rebuild the broadcasting beam weights. However, such algorithms need extremely complex computation and the side effects could be unwanted worse side lobe and degradation of polarization orthogonality.

The present disclosure proposes an improved solution for fault mitigation in a base station. For the example of broadcasting beam, the basic idea of the solution is to detect faulty antenna element(s) and evaluate the impact from the faulty antenna element(s) by estimating the broadcasting beam's radiation power in a plurality of directions. If in some specific direction, the radiation power dropped due to a fault of the detected faulty antenna element(s), a separate (e.g. narrow) beam can be sent out for that direction to make up the affected coverage. In this way, the legacy broadcasting beam weights can be kept even with some RF path being broken, without needing to change the existing calculation method of broadcasting beam weights.

The solution may be applied to a wireless communication system including a terminal device and a base station. The terminal device can communicate through a radio access communication link with the base station. The base station can provide radio access communication links to terminal devices that are within its communication service cell. The base station may be, for example, an evolved node base station (eNodeB or eNB) in LTE or a next generation node base station (gNB) in new ratio (NR). As an option, the base station may include a BBU, an RRU and an antenna array. As another option, the base station may be partly implemented in a CU, and partly implemented as a DU and an AAU. Note that the base station may take any other suitable forms depending on the actual application scenario.

The communications may be performed between the terminal device and the base station according to any suitable communication standards and protocols. The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 6:
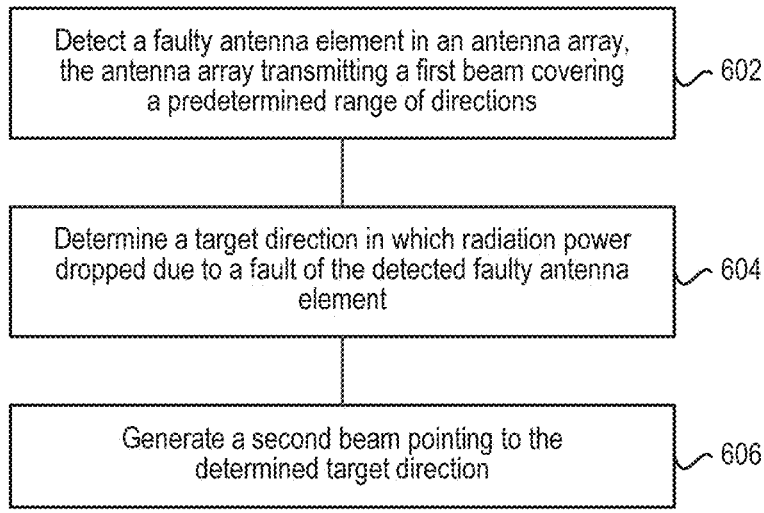
FIG. 6 is a flowchart illustrating a method in a base station according to an embodiment of the disclosure.
Figure 7:
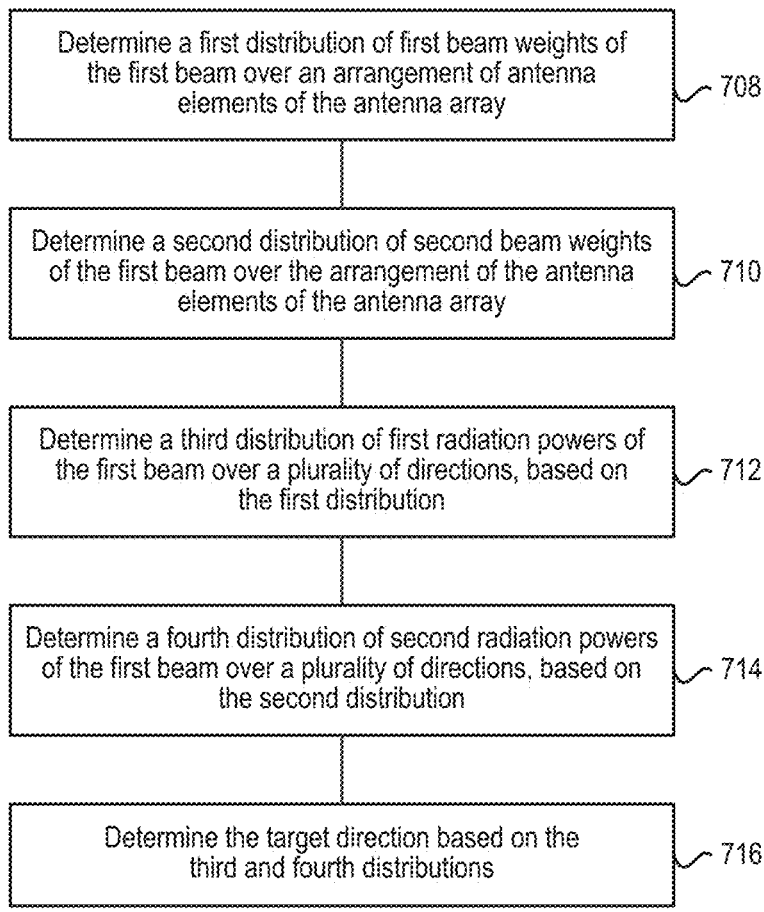
FIG. 7 is a flowchart for explaining the method of FIG. 6.
Figure 8:
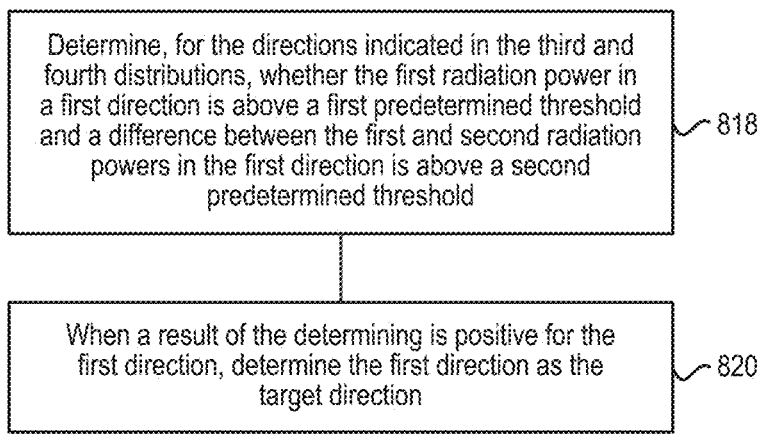
FIG. 8 is a flowchart for explaining the method of FIG. 7.
Figure 9:
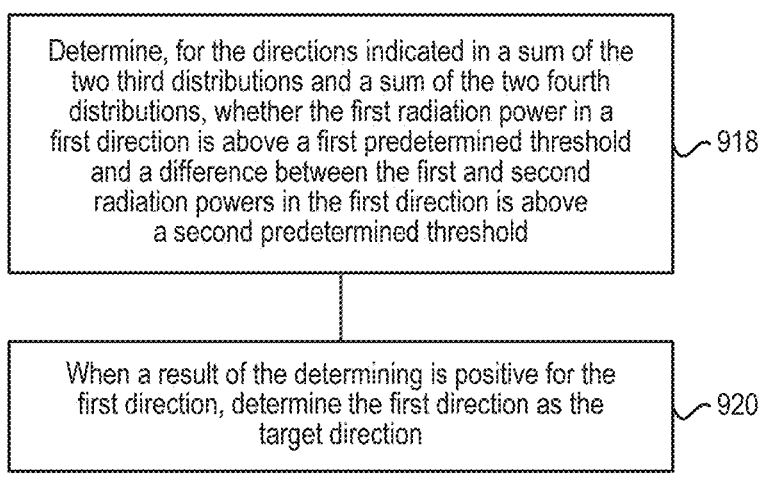
FIG. 9 is a flowchart for explaining the method of FIG. 7.

Hereinafter, the solution of the present disclosure will be described in detail with reference to FIGS. 6-19. FIG. 6 is a flowchart illustrating a method in a base station according to an embodiment of the disclosure. At block 602, a faulty antenna element in an antenna array is detected. The antenna array transmits a first beam covering a predetermined range of directions. For example, the first beam may be a broadcasting beam and the predetermined range of directions may be set by the device vendor or the network operator. Note that any other suitable broad beam may also be used as the first beam. As mentioned above, the fault happening in the antenna array may cover any type of fault, and thus, more than one faulty antenna elements in the antenna array may be detected.

As an exemplary example, the faulty antenna element may be detected by using antenna calibration. Specifically, a calibration signal may be periodically sent out by each antenna element and be also coupled back to a calibration antenna port. If the calibration signal sent by any or several antenna elements is lower than an expected value, this/these antenna element(s) may be detected as faulty antenna element(s). Alternatively, various legacy mechanisms (e.g. digital pre-distortion (DPD), voltage standing wave ratio (VSWR) detection, etc.) for detecting faulty antenna element(s) in multi-antenna system, especially massive multiple-input multiple-output (MIMO) system (the number of antenna ports>=16 for low or mid band and >=64 for high band), may also be used to (e.g. continuously) detect the faulty antenna element(s).

At block 604, a target direction in which radiation power dropped due to a fault of the detected faulty antenna element is determined. Since more than one faulty antenna elements may be detected, more than one target directions may be determined. For example, the term "drop" may mean that the radiation power is below a certain threshold (in one embodiment) or that the radiation power cannot provide acceptable coverage and terminal devices experience dropped calls (in another embodiment). As a first option, block 604 may be implemented as blocks 708-716 of FIG. 7.

Figure 1:
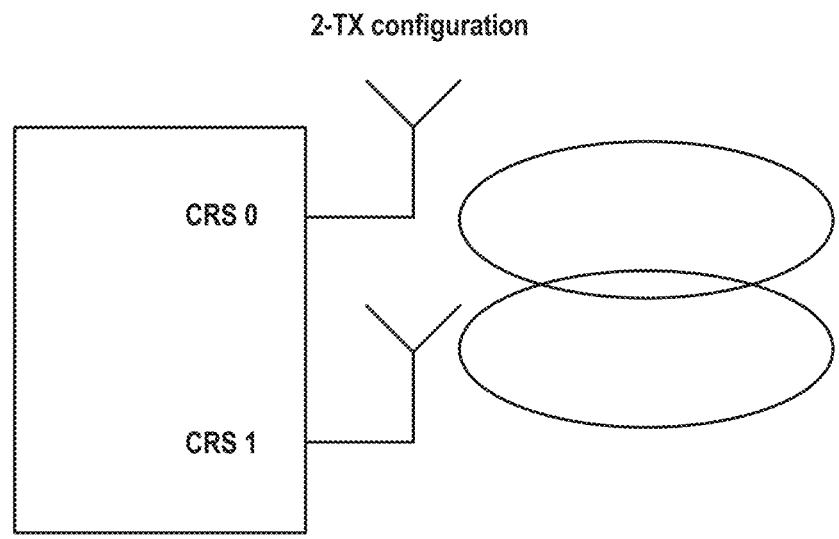
FIG. 1 is a diagram illustrating an example of CRS for broadcasting beam.
Figure 2A:
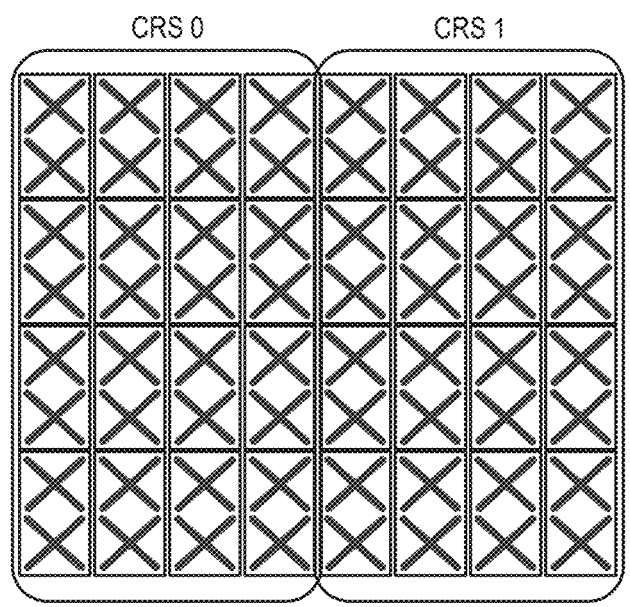
Figure 3C:
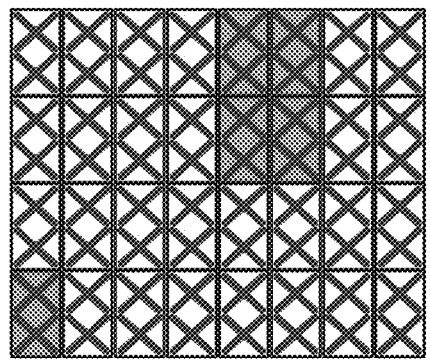
Figure 3D:
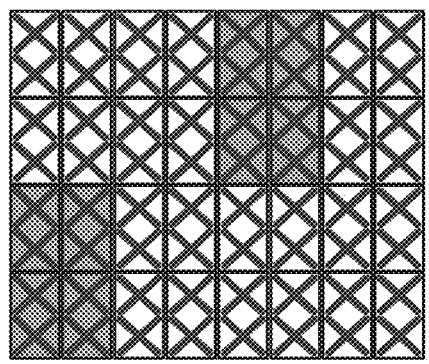

At block 708, a first distribution of first beam weights of the first beam over an arrangement of antenna elements of the antenna array is determined. The first beam weights correspond to a first case in which there is no faulty antenna element in the antenna array. The first beam weights may be the original beam weights applied to the antenna array for transmitting the first beam. The arrangement of the antenna elements may refer to how the antenna elements are physically arranged to form the antenna array. For the example shown in FIG. 2A, each "X" symbol represents two antenna elements with two polarizations orthogonal to each other and the two antenna elements are applied with independent beam weights. Thus, for each of the two polarizations, the arrangement of the antenna elements takes the form of an array of 8*8. Correspondingly, a first distribution may be determined for each of the two polarizations. That is, two first distributions may be determined for two component beams of the first beam which have the two polarizations. Note that if the two antenna elements represented by each "X" symbol in FIG. 2A are replaced by one antenna element with the same one polarization, only one first distribution may be determined.

As an example, the first distribution may be represented by a matrix whose dimension is the same as that of the arrangement of the antenna elements of the antenna array. For example, suppose the first beam weights of the first beam (e.g. a broadcasting beam) are $\mathbb{W}$, then $\mathbb{W}$ may be represented as a 2D matrix below:

$$\mathbb{W} = \begin{bmatrix} W_{1,1} & \cdots & W_{1,V} \\ \vdots & \ddots & \vdots \\ W_{H,1} & \cdots & W_{H,V} \end{bmatrix},$$

where each row of the matrix corresponds to antenna elements in one row of the antenna array and each column of the matrix corresponds to antenna elements in one column in the antenna array.

At block 710, a second distribution of second beam weights of the first beam over the arrangement of the antenna elements of the antenna array is determined. The second beam weights correspond to a second case in which there is the detected faulty antenna element in the antenna array. For example, in the second distribution the second beam weight corresponding to the detected faulty antenna element may be below a third predetermined threshold. The remaining second beam weights may be the same as the corresponding first beam weights. For example, suppose the faulty antenna element is the antenna element (1, V). Then, the corresponding beam weight may be set as zero considering that no transmission power due to a hardware error is equivalent to setting the transmission beam weight as zero for this antenna element. Thus, the second distribution may be represented as:

$$\mathbb{W}' = \begin{bmatrix} W_{1,1} & \cdots & 0 \\ \vdots & \ddots & \vdots \\ W_{H,1} & \cdots & W_{H,V} \end{bmatrix}.$$

Note that for an antenna array (such as shown in FIG. 2A) with two polarizations orthogonal to each other, a second distribution may be determined for each of the two polarizations. That is, two second distributions may be determined for the two component beams of the first beam.

At block 712, a third distribution of first radiation powers of the first beam corresponding to the first case over a plurality of directions is determined based on the first distribution. As a simplest example, the third distribution may be determined by applying 2D Fourier transformation (e.g. 2D-FFT) to the first distribution. Thereby, the first radiation powers can be mapped to corresponding directions. For the example of W mentioned above, the third distribution may be represented as:

$$\mathbb{P} = \begin{bmatrix} P_{1,1} & \cdots & P_{1,n} \\ \vdots & \ddots & \vdots \\ P_{m,1} & \cdots & P_{m,n} \end{bmatrix} = \mathrm{abs}(2D - FFT(\mathbb{W}))^{\wedge}2,$$

where each element corresponding to a specific horizontal direction and elevation direction, for example, $P_{i,j}$, indicates the radiation power in the horizontal direction i and the elevation direction j. As another example, the third distribution may be determined by using direction of arrival (DoA) detection techniques such as multi-signal classification (MUSIC) algorithm.

As another example, the first distribution may be represented by an extended matrix whose dimension is larger than that of the arrangement of the antenna elements of the antenna array. The elements in the extended matrix for which there are no corresponding antenna elements may equal to zero. The use of the extended matrix may be especially helpful when the number of rows or columns contained in the arrangement of the antenna elements of the antenna array is below a predetermined number. For example, if a finer spatial granularity is desired, especially when the value of H and/or V is small (e.g. V=2 or 4 in some AAS product), over-sampling of spatial radiation power can be applied. Suppose a finer granularity in H is desired, the matrix $\mathbb{W}$ may be pended with zeros as shown below to extend FFT size (over-sampling in spatial domain):

$$\mathbb{W}_{extend} = \begin{bmatrix} W_{1,1} & \cdots & W_{1,V} \\ \vdots & \ddots & \vdots \\ W_{H,1} & \cdots & W_{H,V} \\ 0 & \cdots & 0 \\ \vdots & \ddots & \vdots \\ 0 & \cdots & 0 \end{bmatrix}.$$

The corresponding third distribution can be represented as:

$$\mathbb{P}_{extend} = \begin{bmatrix} P_{1,1} & \cdots & P_{1,n} \\ \vdots & \ddots & \vdots \\ P_{m',1} & \cdots & P_{m',n} \end{bmatrix} = \mathrm{abs}(2D - FFT(\mathbb{W}_{extend}))^{\wedge}2.$$

By performing 2D-FFT on the extended beam weights, the granularity of H domain spatial power density can be finer. Similarly, the granularity of V domain spatial power density can also be improved. Note that for an antenna array (such as shown in FIG. 2A) with two polarizations orthogonal to each other, a third distribution may be determined for each of the two polarizations. That is, two third distributions may be determined for the two component beams of the first beam.

At block 714, a fourth distribution of second radiation powers of the first beam corresponding to the second case over a plurality of directions is determined based on the second distribution. Similar to block 712, the fourth distribution may be determined by applying 2D Fourier transformation (e.g. 2D-FFT) to the second distribution. Alternatively, the fourth distribution may be determined by using DoA detection techniques such as MUSIC algorithm. For the example of $\mathbb{W}$, the fourth distribution may be represented as:

$$\mathbb{P} = \mathrm{abs}(2D-FFT(\mathbb{W}))/{\wedge}2.$$

Note that for an antenna array (such as shown in FIG. 2A) with two polarizations orthogonal to each other, a fourth distribution may be determined for each of the two polarizations. That is, two fourth distributions may be determined for the two component beams of the first beam.

At block 716, the target direction is determined based on the third and fourth distributions. Depending on whether the two polarizations are employed, block 716 may be implemented as blocks 818-820 of FIG. 8 (where one polarization is employed) or blocks 918-920 of FIG. 9 (where two polarizations are employed). At block 818, it is determined, for the directions indicated in the third and fourth distributions, whether the first radiation power in a first direction is above a first predetermined threshold and a difference between the first and second radiation powers in the first direction is above a second predetermined threshold. When a result of the determining at block 818 is positive for the first direction, the first direction is determined as the target direction at block 820. For example, each of the directions indicated in the third and fourth distributions may be checked to determine the target direction. As another example, if it can be determined in advance that the faulty antenna element(s) will cause only one target direction, the directions may be checked one after another and the first one that satisfies the conditions mentioned above may be determined as the target direction. Then, the checking can be stopped.

For the example mentioned above, if $P_{i,j} > P_{threshold\_1}$ and $P_{threshold\_2} < P_{i,j}$, then the direction (i,j) may be determined as the target direction. The first predetermined threshold $P_{threshold\_1}$ may indicate the desired cell shape threshold for direction (i,j). As an exemplary example, $P_{threshold\_1}=0.1*\max\{P_{i,j}\}$, which implies that if the power in a direction is lower than that in the peak power direction by 10 dB, then this direction is not the desired coverage direction. The second predetermined threshold $P_{threshold\_2}$ may mean that if the power in a direction is caused by faulty antenna element(s) to degrade larger than or equal to a certain threshold, then special processing is needed. It may normally depend on the operator's requirement on the coverage. As an exemplary example, $P_{threshold\_2}$ may be 5 dB or 8 dB. Note that it is also possible to perform block 716 by using only one threshold. For example, if a difference between the first and second radiation powers in a direction is above the second predetermined threshold, the direction may be determined as the target direction.

As mentioned above, for an antenna array (such as shown in FIG. 2A) with two polarizations orthogonal to each other, there are two third distributions and two fourth distributions for the two component beams of the first beam. In this case, the two third distributions may be summed as an overall third distribution and the two fourth distributions may be summed as an overall fourth distribution to evaluate the first and second radiation powers in a plurality of directions. That is, at block 918, it is determined, for the directions indicated in a sum of the two third distributions and a sum of the two fourth distributions, whether the first radiation power in a first direction is above a first predetermined threshold and a difference between the first and second radiation powers in the first direction is above a second predetermined threshold. When a result of the determining is positive for the first direction, the first direction is determined as the target direction at block 920.

Figure 10:
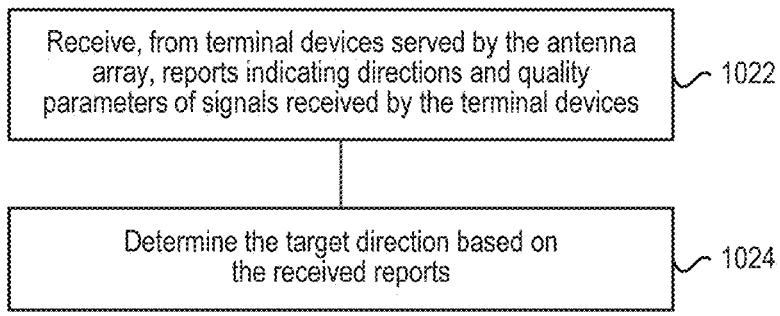
FIG. 10 is a flowchart for explaining the method of FIG. 6.
Figure 11:
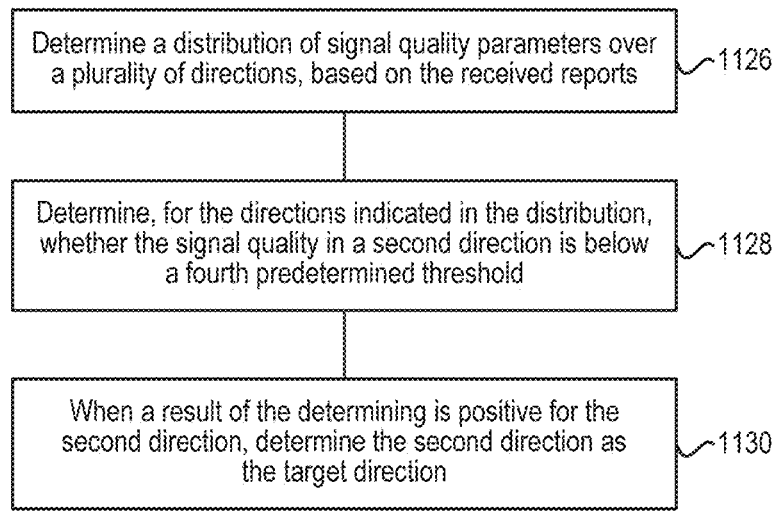
FIG. 11 is a flowchart for explaining the method of FIG. 10.

As a second option, block 604 may be implemented as blocks 1022-1024 of FIG. 10. At block 1022, reports indicating directions and quality parameters of signals received by terminal devices served by the antenna array are received from terminal devices. For example, a report received from a terminal device may be a channel status indicator (CSI) report. The CSI report may include precoder matrix index (PMI) indicating the direction of a signal received by the terminal device. The CSI report may also include downlink signal channel quality indicator (CQI) indicating the quality of a signal received by the terminal device.

At block 1024, the target direction is determined based on the received reports. For example, block 1024 may be implemented as blocks 1126-1130 of FIG. 11. At block 1126, a distribution of signal quality parameters over a plurality of directions is determined based on the received reports. For example, the direction of a signal received by a terminal device may be determined from the PMI as described in 3GPP TS 36.213 V15.7.0, TS 38.213 V15.7.0 and TS 38.214 V15.7.0. With sufficient number of CSI reports received from the terminal devices, statistic values of the signal quality parameters in a plurality of directions may be obtained from the CSI reports so that the distribution can be generated. At block 1128, it is determined, for directions indicated in the distribution, whether the signal quality in a second direction is below a fourth predetermined threshold. When a result of the determining is positive for the second direction, the second direction is determined as the target direction at block 1130. Compared with this second option for block 604, the first option for block 604 can achieve real time operation since it relies on beam weights without needing to collect sufficient number of reports.

Referring back to FIG. 6, at block 606, a second beam pointing to the determined target direction is generated.

Since more than one target directions may be determined, more than one second beams may be generated for pointing to the more than one target directions, respectively. With the method of FIG. 6, the impact of the faulty antenna element can be mitigated conveniently without changing the original beam weights applied to the antenna array for transmitting the first beam.

To make the transmission powers of the second beam and the first beam be accumulated at the receiver side of a terminal device, several options may be employed. As the first option, the second beam may be generated to have a predetermined delay or a predetermined timing advance relative to the first beam. This may be based on the following considerations. Due to the nature of over-the-air transmission, multi-path propagation is unavoidable. A UE receiver should accumulate powers from different paths with separate delays. To utilize this UE capability, the second beam can add an artificial (e.g. manually configured) delay or timing advance (e.g. 300 ns). The UE can observe multiple paths from the base station. Some of them (actually from the first beam) may have relatively lower power and larger delay and some of them (actually from the second beam) may have relatively higher power and smaller delay. The UE's receiver can combine the powers of the second beam and the first beam.

As the second option, the second beam may be generated to have a predetermined cyclic phase shift per subcarrier in frequency domain. This option is an enhancement of the first option and may be based on the following considerations. Artificial (e g manually added) delay for one beam will increase the effective channel delay spread at the UE's receiver side. This will require less peak delay spread from air interface. For example, LTE support 4.7 us cyclic prefix (CP) length, i.e. air interface delay plus timing misalignment at the UE side should not exceed 4.7 us or it will introduce inter-OFDM-symbol interference. If a 300 ns delay is added, 4.7 us total timing budget will be reduced to 4.4 us. This normally will not bring any problem in a typical scenario, but in some extreme corner case, like a very large cell, the system hopes that 4.7 us budget will not be impacted. For this case, the second option is feasible.

Considering that a delay in time domain will be presented as a cyclic phase shift per subcarrier in frequency domain, the second solution introduces cyclic phase shift for the second beam in frequency domain, to simulate delay spread. But different with the first solution, in time domain, each OFDM symbol's boundary will be the same with the first beam.

As the third option, the second beam may be generated to have a second polarization orthogonal to a first polarization of the first beam in the target direction. This option applies to the case in which the first beam has two component beams with different polarizations orthogonal to each other. The first polarization of the first beam may be the polarization of one component beam whose radiation power is larger than that of the other component beam by a predetermined difference value or more. The radiation powers of the two component beams in a direction may be indicated by the two fourth distributions mentioned above, respectively.

The third option may be based on the following considerations. Referring to FIG. 2B, even for CRS0, its radiation power is actually combination of two different beams. For ease of description, they may be called component beams of the first beam. Each component beam comes from one polarization. If in some target direction, one component beam's radiation power is much lower than another component beam (e.g. −15 dB), i.e. most of the first beam's radiation power comes from one polarization, then the second beam can occupy another polarization and be transmitted from this polarization. In this case, the first beam mainly comes from one polarization, and the second beam comes from another polarization. The UE's receiver can combine the powers from these 2 polarizations.

As described above, the base station may take any suitable forms depending on the actual application scenario. As an option, the base station may include a BBU, an RRU and an antenna array. In this case, blocks 602-606 may be performed by one of the BBU and the RRU, or distributed between the BBU and the RRU. As another option, the base station may be partly implemented in a CU, and partly implemented as a DU and an AAU including the antenna array. In this case, blocks 602-606 may be performed by one of the CU, the DU and the AAU, or distributed between two or more of the CU, the DU and the AAU. Note that it is also possible to distribute some portion of blocks 602-606 to another node different than the base station. For example, an operation administration and maintenance (OAM) system or an expert system may receive related information from the base station and perform some processing for block 604.

Figure 12:
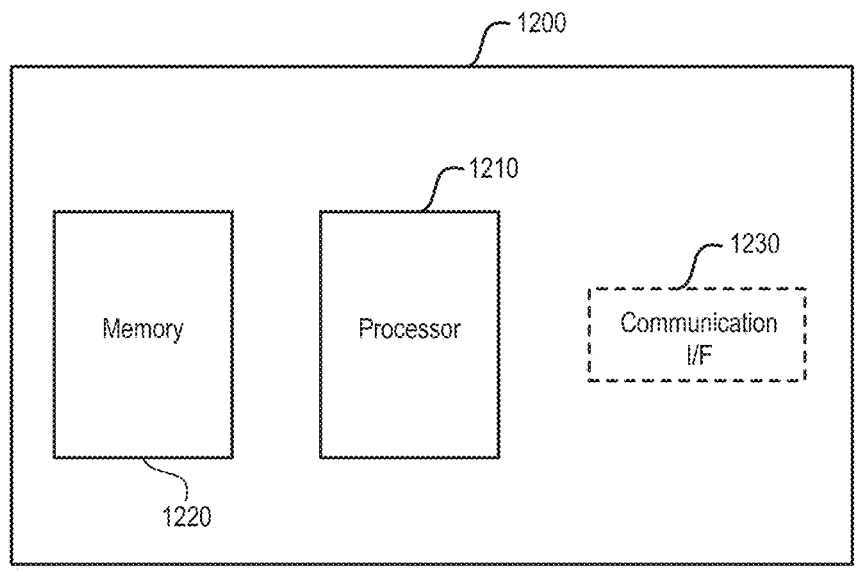
FIG. 12 is a block diagram showing an apparatus suitable for use in practicing some embodiments of the disclosure.

FIG. 12 is a block diagram showing an apparatus suitable for use in practicing some embodiments of the disclosure. For example, any component of the base station described above may be implemented through the apparatus 1200. As shown, the apparatus 1200 may include a processor 1210, a memory 1220 that stores a program, and optionally a communication interface 1230 for communicating data with other external devices through wired and/or wireless communication.

The program includes program instructions that, when executed by the processor 1210, enable the apparatus 1200 to operate in accordance with the embodiments of the present disclosure, as discussed above. That is, the embodiments of the present disclosure may be implemented at least in part by computer software executable by the processor 1210, or by hardware, or by a combination of software and hardware.

The memory 1220 may be of any type suitable to the local technical environment and may be implemented using any suitable data storage technology, such as semiconductor based memory devices, flash memories, magnetic memory devices and systems, optical memory devices and systems, fixed memories and removable memories. The processor 1210 may be of any type suitable to the local technical environment, and may include one or more of general purpose computers, special purpose computers, microprocessors, digital signal processors (DSPs) and processors based on multi-core processor architectures, as non-limiting examples.

Figure 13:
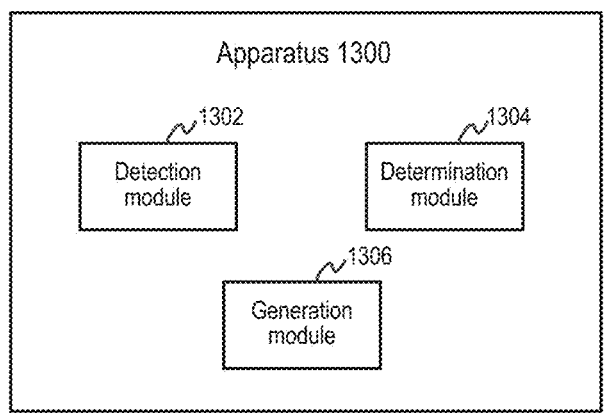
FIG. 13 is a block diagram showing an apparatus according to an embodiment of the disclosure.

FIG. 13 is a block diagram showing an apparatus according to an embodiment of the disclosure. As shown, the apparatus 1300 comprises a detection module 1302, a determination module 1304 and a generation module 1306. The detection module 1302 may be configured to detect a faulty antenna element in an antenna array, as described above with respect to block 602. The antenna array may transmit a first beam covering a predetermined range of directions. The determination module 1304 may be configured to determine a target direction in which radiation power dropped due to a fault of the detected faulty antenna element, as described above with respect to block 604. The generation module 1306 may be configured to generate a second beam pointing to the determined target direction, as described above with respect to block 606. The modules described above may be implemented by hardware, or software, or a combination of both.

For example, the apparatus 1000 may be one of: a BBU; an RRU; a combination of a BBU and an RRU; a CU; a DU; an AAU; and a combination of two or more of a CU, a DU and an AAU.

Figure 14:
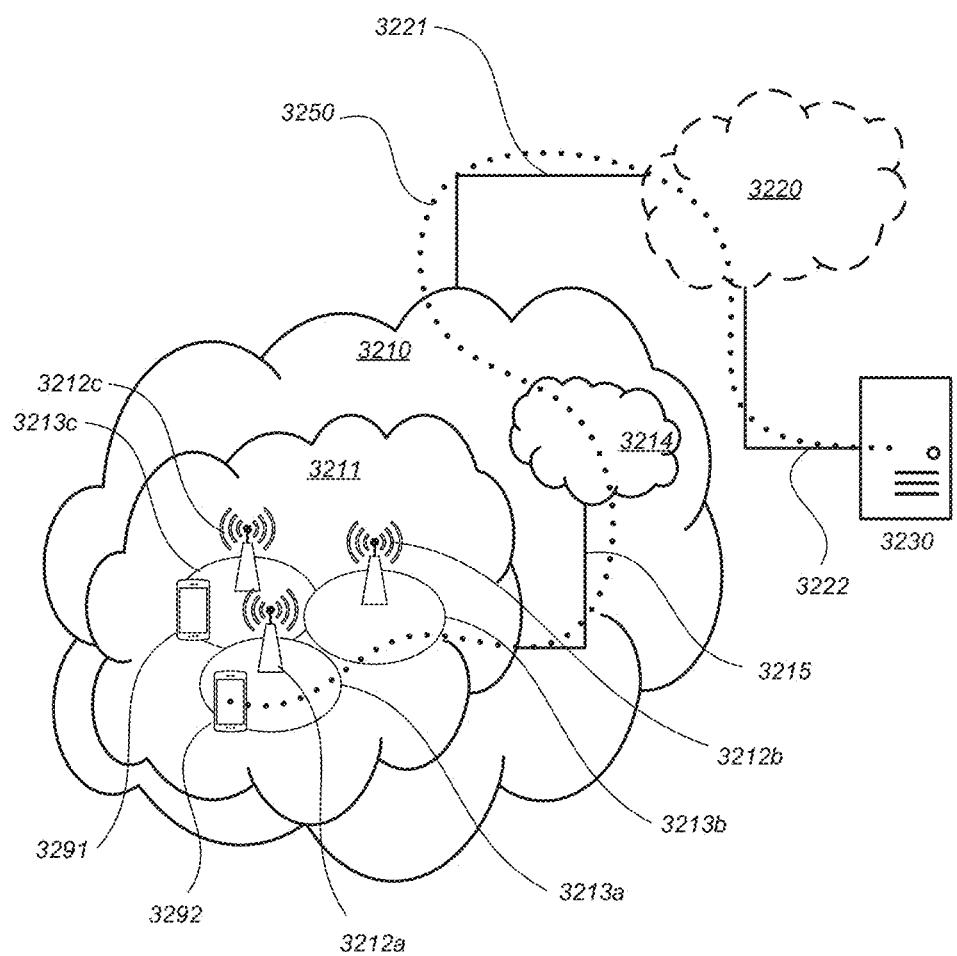
FIG. 14 is a diagram showing a telecommunication network connected via an intermediate network to a host computer in accordance with some embodiments.

With reference to FIG. 14, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 14 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 15. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 15) served by base station 3320. Communication interface 3326 may be configured to facilitate connection 3360 to host computer 3310. Connection 3360 may be direct or it may pass through a core network (not shown in FIG. 15) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 15:
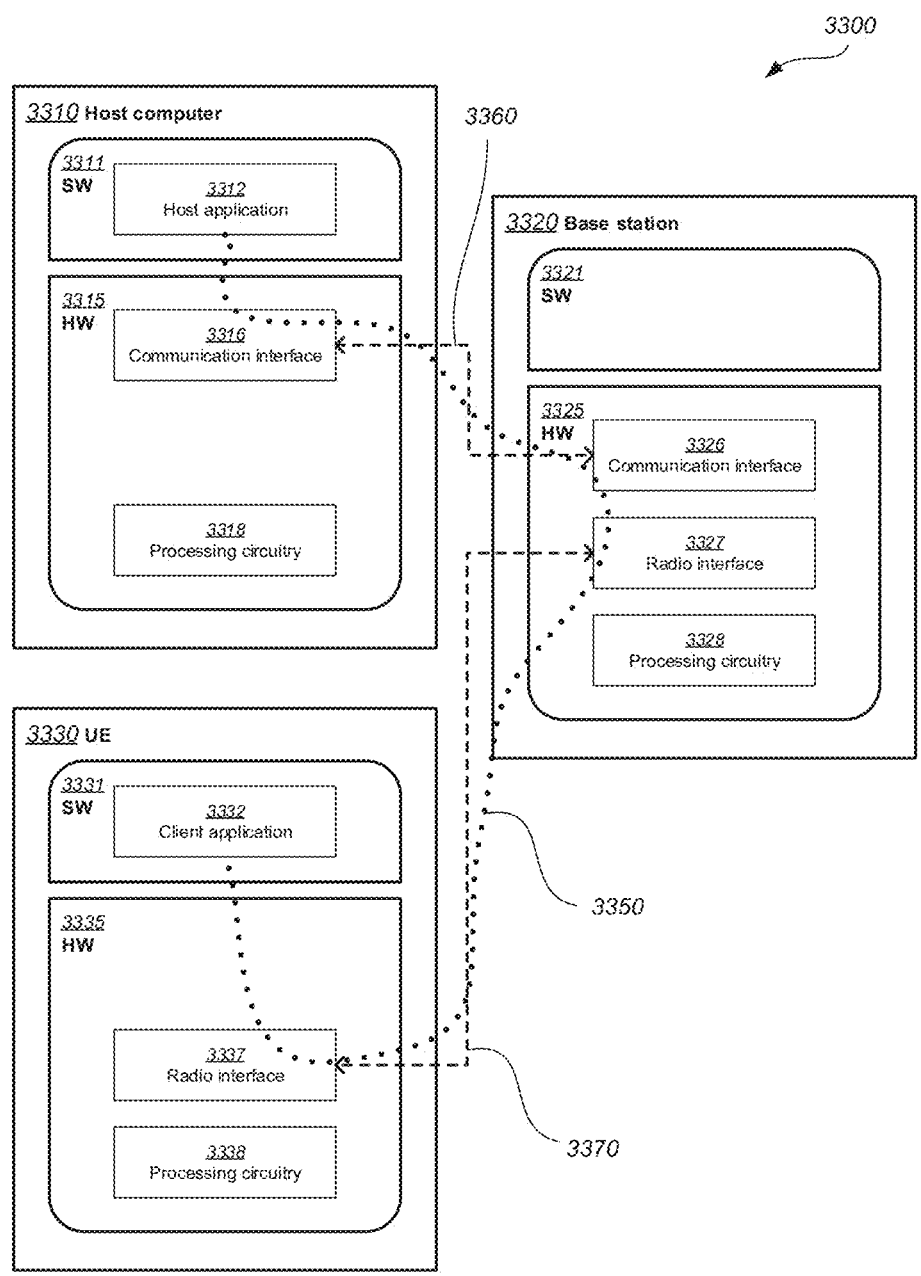
FIG. 15 is a diagram showing a host computer communicating via a base station with a user equipment in accordance with some embodiments.

It is noted that host computer 3310, base station 3320 and UE 3330 illustrated in FIG. 15 may be similar or identical to host computer 3230, one of base stations 3212*a*, 3212*b*, 3212*c* and one of UEs 3291, 3292 of FIG. 14, respectively. This is to say, the inner workings of these entities may be as shown in FIG. 15 and independently, the surrounding network topology may be that of FIG. 14.

In FIG. 15, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 16:
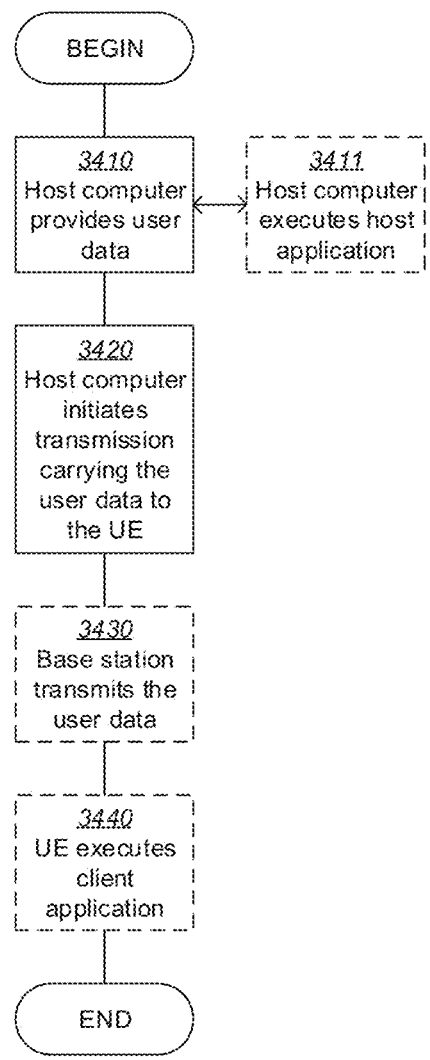
FIG. 16 is a flowchart illustrating a method implemented in a communication system in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 17:
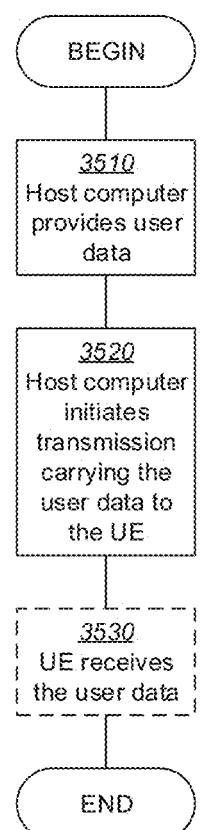
FIG. 17 is a flowchart illustrating a method implemented in a communication system in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 18:
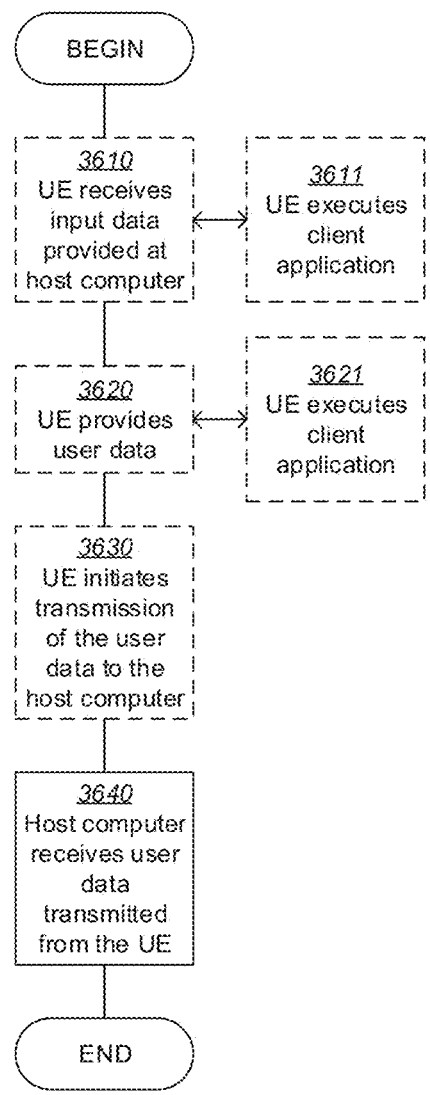
FIG. 18 is a flowchart illustrating a method implemented in a communication system in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 19:
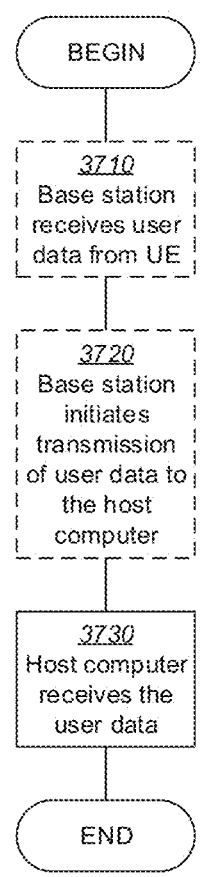
FIG. 19 is a flowchart illustrating a method implemented in a communication system in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

According to an aspect of the disclosure, there is provided a method implemented in a communication system including a host computer, a base station and a terminal device. The method may comprise, at the host computer, providing user data. The method may further comprise, at the host computer, initiating a transmission carrying the user data to the terminal device via a cellular network comprising the base station. The base station may detect a faulty antenna element in an antenna array. The antenna array may transmit a first beam covering a predetermined range of directions. The base station may determine a target direction in which radiation power dropped due to a fault of the detected faulty antenna element. The base station may generate a second beam pointing to the determined target direction.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

According to another aspect of the disclosure, there is provided a communication system including a host computer comprising processing circuitry configured to provide user data and a communication interface configured to forward the user data to a cellular network for transmission to a terminal device. The cellular network may comprise a base station having a radio interface and processing circuitry. The base station's processing circuitry may be configured to detect a faulty antenna element in an antenna array. The antenna array may transmit a first beam covering a predetermined range of directions. The base station's processing circuitry may be configured to determine a target direction in which radiation power dropped due to a fault of the detected faulty antenna element. The base station's processing circuitry may be configured to generate a second beam pointing to the determined target direction.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described. It should be noted that two blocks shown in succession in the figures may, in fact, be executed substantially concurrently, or the blocks may sometimes be executed in the reverse order, depending upon the functionality involved.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method in a base station, comprising:
    detecting a faulty antenna element in an antenna array, the antenna array transmitting a first beam covering a predetermined range of directions;
    determining a target direction in which radiation power dropped due to a fault of the detected faulty antenna element; and
    generating a second beam pointing to the determined target direction to combine the first and second beams at the receiver.

2. The method according to claim 1, wherein determining the target direction comprises:
    determining a first distribution of first beam weights of the first beam over an arrangement of antenna elements of the antenna array, wherein the first beam weights correspond to a first case in which there is no faulty antenna element in the antenna array;
    determining a second distribution of second beam weights of the first beam over the arrangement of the antenna elements of the antenna array, wherein the second beam weights correspond to a second case in which there is the detected faulty antenna element in the antenna array;
    determining a third distribution of first radiation powers of the first beam corresponding to the first case over a plurality of directions, based on the first distribution;
    determining a fourth distribution of second radiation powers of the first beam corresponding to the second case over a plurality of directions, based on the second distribution; and
    determining the target direction based on the third and fourth distributions.

3. The method according to claim 2, wherein the third distribution is determined by applying two-dimensional, 2D, Fourier transformation to the first distribution; and
    wherein the fourth distribution is determined by applying 2D Fourier transformation to the second distribution.

4. The method according to claim 3, wherein the 2D Fourier transformation comprises 2D fast Fourier transformation, 2D-FFT.

5. The method according to claim 2, wherein the first beam has two component beams with different polarizations orthogonal to each other; and
    wherein two first distributions, two second distributions, two third distributions and two fourth distributions are determined for the two component beams.

6. The method according to claim 2, wherein determining the target direction based on the third and fourth distributions comprises:
    determining, for the directions indicated in the third and fourth distributions, whether the first radiation power in a first direction is above a first predetermined threshold and a difference between the first and second radiation powers in the first direction is above a second predetermined threshold; and
    when a result of the determining is positive for the first direction, determining the first direction as the target direction.

7. The method according to claim 2, wherein the first distribution is represented by a matrix whose dimension is the same as that of the arrangement of the antenna elements of the antenna array.

8. The method according to claim 1, wherein determining the target direction comprises:
 receiving, from terminal devices served by the antenna array, reports indicating directions and quality parameters of signals received by the terminal devices; and
 determining the target direction based on the received reports.

9. The method according to claim 8, wherein a report received from a terminal device is a channel status indicator, CSI, report;
 wherein the CSI report includes precoder matrix index, PMI, indicating the direction of a signal received by the terminal device; and
 wherein the CSI report includes downlink signal channel quality indicator, CQI, indicating the quality of a signal received by the terminal device.

10. The method according to claim 1, wherein the second beam is generated to have a predetermined delay or a predetermined timing advance relative to the first beam.

11. The method according to claim 1, wherein the second beam is generated to have a predetermined cyclic phase shift per subcarrier in frequency domain.

12. The method according to claim 1, wherein the second beam is generated to have a second polarization orthogonal to a first polarization of the first beam in the target direction.

13. The method according to claim 1, wherein the first beam is a broadcasting beam.

14. An apparatus in a base station, comprising:
 at least one processor; and
 at least one memory, the at least one memory containing instructions executable by the at least one processor, whereby the apparatus is operative to:
 detect a faulty antenna element in an antenna array, the antenna array transmitting a first beam covering a predetermined range of directions;
 determine a target direction in which radiation power dropped due to a fault of the detected faulty antenna element; and
 generate a second beam pointing to the determined target direction to combine the first and second beams at the receiver.

15. The apparatus according to claim 14, wherein the instructions are executable by the at least one processor, whereby the apparatus is operative to determine the target direction by:
 determining a first distribution of first beam weights of the first beam over an arrangement of antenna elements of the antenna array, wherein the first beam weights correspond to a first case in which there is no faulty antenna element in the antenna array;
 determining a second distribution of second beam weights of the first beam over the arrangement of the antenna elements of the antenna array, wherein the second beam weights correspond to a second case in which there is the detected faulty antenna element in the antenna array;
 determining a third distribution of first radiation powers of the first beam corresponding to the first case over a plurality of directions, based on the first distribution;
 determining a fourth distribution of second radiation powers of the first beam corresponding to the second case over a plurality of directions, based on the second distribution; and
 determining the target direction based on the third and fourth distributions.

16. The apparatus according to claim 14, wherein the instructions are executable by the at least one processor, whereby the apparatus is operative to determine the target direction by:
 receiving, from terminal devices served by the antenna array, reports indicating directions and quality parameters of signals received by the terminal devices; and
 determining the target direction based on the received reports.

17. The apparatus according to claim 16, wherein a report received from a terminal device is a channel status indicator, CSI, report;
 wherein the CSI report includes precoder matrix index, PMI, indicating the direction of a signal received by the terminal device; and
 wherein the CSI report includes downlink signal channel quality indicator, CQI, indicating the quality of a signal received by the terminal device.

18. The apparatus according to claim 14, wherein the instructions are executable by the at least one processor, whereby the apparatus is operative to generate the second beam to have a predetermined delay or a predetermined timing advance relative to the first beam.

19. The apparatus according to claim 14, wherein the instructions are executable by the at least one processor, whereby the apparatus is operative to generate the second beam to have a predetermined cyclic phase shift per subcarrier in frequency domain.

20. The apparatus according to claim 14, wherein the instructions are executable by the at least one processor, whereby the apparatus is operative to generate the second beam to have a second polarization orthogonal to a first polarization of the first beam in the target direction.

21. The apparatus according to claim 14, wherein the apparatus is one of:
 a building baseband unit, BBU;
 a remote radio unit, RRU;
 a combination of a BBU and an RRU;
 a centralized unit, CU;
 a distributed unit, DU;
 an active antenna unit, AAU; and
 a combination of two or more of a CU, a DU and an AAU.

22. A method in a base station, comprising:
 detecting a faulty antenna element in an antenna array, the antenna array transmitting a first beam covering a predetermined range of directions;
 determining a target direction in which radiation power dropped due to a fault of the detected faulty antenna element; and
 generating a second beam pointing to the determined target direction to combine the first and second beams at the receiver,
 wherein determining the target direction comprises:
 determining a first distribution of first beam weights of the first beam over an arrangement of antenna elements of the antenna array, wherein the first beam weights correspond to a first case in which there is no faulty antenna element in the antenna array;
 determining a second distribution of second beam weights of the first beam over the arrangement of the antenna elements of the antenna array, wherein the second beam weights correspond to a second case in which there is the detected faulty antenna element in the antenna array;

determining a third distribution of first radiation powers of the first beam corresponding to the first case over a plurality of directions, based on the first distribution;

determining a fourth distribution of second radiation powers of the first beam corresponding to the second case over a plurality of directions, based on the second distribution; and determining the target direction based on the third and fourth distributions, wherein the first distribution is represented by an extended matrix whose dimension is larger than that of the arrangement of the antenna elements of the antenna array; and wherein elements in the extended matrix for which there are no corresponding antenna elements equal to zero.

* * * * *